(12) United States Patent
Crawford

(10) Patent No.: US 8,452,353 B2
(45) Date of Patent: May 28, 2013

(54) APPARATUS AND METHODS FOR PROVIDING INTELLIGENT BATTERY MANAGEMENT

(75) Inventor: Jordan Crawford, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 532 days.

(21) Appl. No.: 12/711,346

(22) Filed: Feb. 24, 2010

(65) Prior Publication Data

US 2011/0207509 A1    Aug. 25, 2011

(51) Int. Cl.
*H04M 1/00*    (2006.01)
(52) U.S. Cl.
USPC ..... 455/574; 455/572; 455/343.1; 455/343.4; 455/573
(58) Field of Classification Search
USPC .............. 455/574, 572, 343.1, 343.4, 573
See application file for complete search history.

(56) References Cited

U.S. PATENT DOCUMENTS

| 2006/0135217 A1* | 6/2006 | Sung et al. .................... 455/573 |
| 2008/0188187 A1* | 8/2008 | Armstrong et al. ............. 455/73 |
| 2009/0206797 A1* | 8/2009 | Chueh et al. .................. 320/150 |
| 2010/0151918 A1* | 6/2010 | Annambhotla et al. ...... 455/573 |
| 2010/0317379 A1* | 12/2010 | Gupta .......................... 455/466 |
| 2011/0161276 A1* | 6/2011 | Krumm et al. ................. 706/50 |
| 2012/0108271 A1* | 5/2012 | Lee ........................... 455/456.6 |

* cited by examiner

*Primary Examiner* — Barry Taylor

(57) ABSTRACT

Various embodiments for providing enhanced battery conservation in mobile devices are described. In one or more embodiments, a mobile computing device may include a processor and a battery to supply power to the processor. The device may store user pattern data and/or user preference data. The device may further include a power management module coupled to the processor. The power management module may monitor a location of the device, wireless signal strength, and date/time. The power management module may also monitor and analyze user operation of the device to identify scenarios in which wireless communications can be suspended. The power management module may suspend wireless communication according to these monitored conditions, and analyzed user operations, to reduce battery consumption. Other embodiments are described and claimed.

18 Claims, 5 Drawing Sheets

500

```
┌─────────────────────────────────────┐
│ Monitor and analyze patterns of user operation │
│                                     │
│                 502                 │
└─────────────────────────────────────┘
                  │
┌─────────────────────────────────────┐
│    Monitor location of the device   │
│                                     │
│                 504                 │
└─────────────────────────────────────┘
                  │
┌─────────────────────────────────────┐
│      Measure wireless signal strength      │
│                                     │
│                 506                 │
└─────────────────────────────────────┘
                  │
┌─────────────────────────────────────┐
│       Monitor date and/or time      │
│                                     │
│                 508                 │
└─────────────────────────────────────┘
                  │
┌─────────────────────────────────────┐
│ Suspend one or more wireless communications │
│    according to one or more of the above    │
│                                     │
│                 510                 │
└─────────────────────────────────────┘
```

FIG. 5

APPARATUS AND METHODS FOR PROVIDING INTELLIGENT BATTERY MANAGEMENT

BACKGROUND

A mobile computing device such as a combination handheld computer and mobile telephone or smart phone generally may provide voice and data communications functionality, as well as computing and processing capabilities. The expanding capabilities and modes of communication of such mobile devices can drain the battery if not managed effectively. Accordingly, there may be a need for an improved apparatus and methods for providing intelligent battery management.

BRIEF DESCRIPTION OF THE DRAWINGS

FIG. 5 illustrates a logic flow in accordance with one or more embodiments.

DETAILED DESCRIPTION

Various embodiments are directed to providing intelligent battery management on mobile computing devices. In one or more embodiments, a mobile computing device may monitor various aspects, such as the device's location, the date and time, calendar events, user patterns and the like. The mobile computing device may automatically disable power-consuming operations, in particular, wireless communications, for example, cell phone signal searching and other radio communications, in certain specified scenarios.

Figure 1:
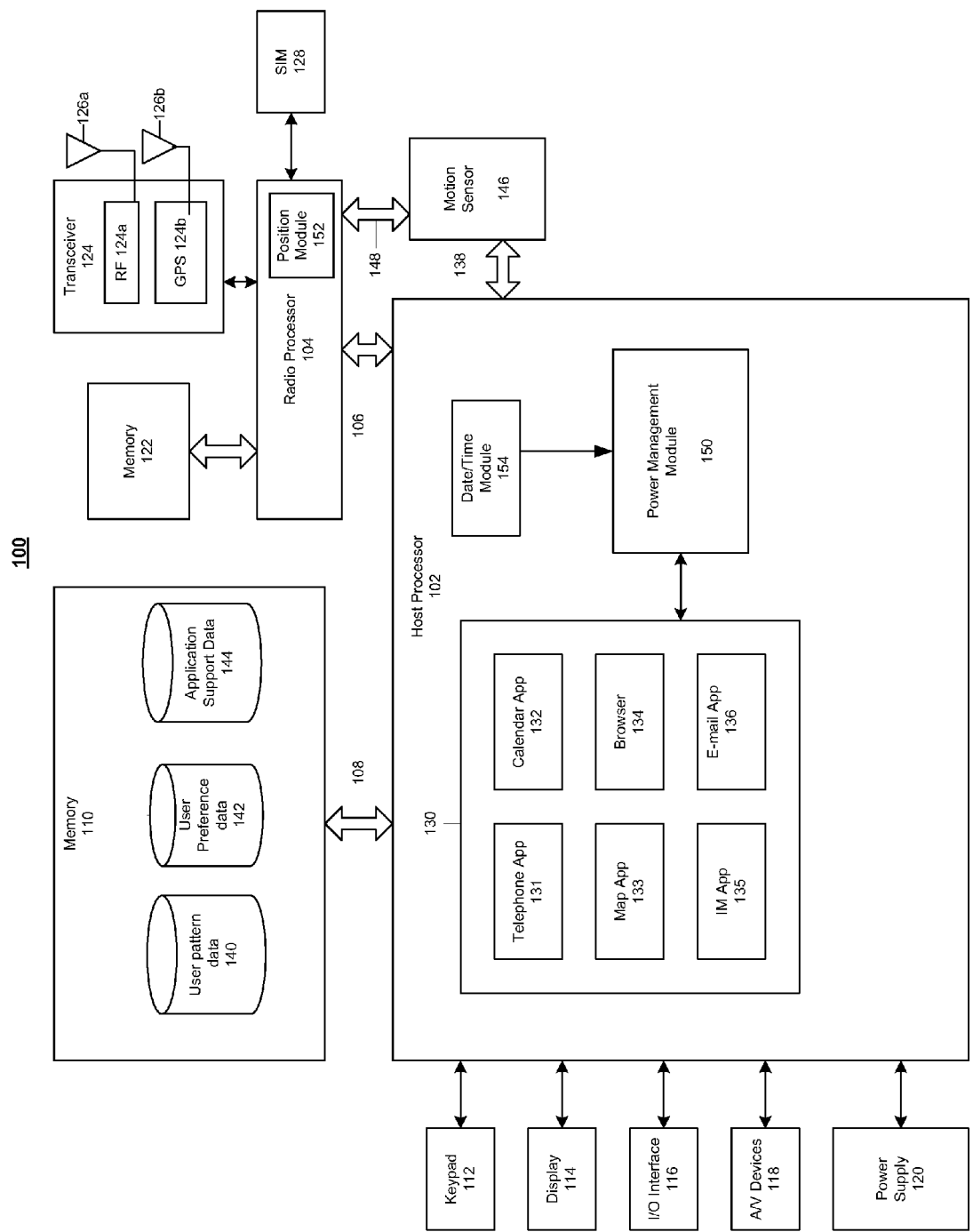
FIG. 1 illustrates a mobile computing device in accordance with one or more embodiments.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, but are not limited to, for example, Palm® products such as Palm® Treo™ and Palm® Pre™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in the embodiment of FIG. 1, the mobile computing device 100 may comprise a dual processor architecture including a host processor 102 and a radio processor 104. In various implementations, the host processor 102 and the radio processor 104 may be arranged to communicate with each other using interfaces 106, such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 102 may be responsible for executing various software programs such as system programs and applications programs to provide computing and processing operations for the mobile computing device 100. The radio processor 104 may be responsible for performing various voice and data communications operations for the mobile computing device 100 such as transmitting and receiving voice and data information over one or more wireless communications channels. Although some embodiments may be described as comprising a dual processor architecture for purposes of illustration, the mobile computing device 100 may comprise any suitable processor architecture and/or any suitable number of processors consistent with the described embodiments.

The host processor 102 may be implemented as a host central processing unit (CPU) using any suitable processor or logic device, such as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 100 may comprise an alphanumeric keypad 112 coupled to the host processor 102. The keypad 112 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise a display 114 coupled to the host processor 102. The display 114 may comprise any suitable visual interface for displaying content to a user of the mobile computing device 100. In one embodiment, for example, the display 114 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an input/output (I/O) interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 118 that support A/V capability of the mobile computing device 100. Examples of A/V devices 118 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply. In various embodiments, power supply 120 may be rechargeable via a USB connection, a wall outlet, solar power, etc.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, in various embodiments some portion or the entire memory 122 may be included on the same integrated circuit as the radio processor 104.

The mobile computing device 100 may comprise a transceiver module 124 coupled to the radio processor 104. The transceiver module 124 may comprise one or more transceivers arranged to communicate using different types of protocols, communication ranges, operating power requirements, RF sub-bands, information types (e.g., voice or data), use scenarios, applications, and so forth. The transceiver module 124 generally may be implemented using one or more chips as desired for a given implementation. Although the transceiver module 124 may be shown as being separate from and external to the radio processor 104 for purposes of illustration, in various embodiments some portion or the entire transceiver module 124 may be included on the same integrated circuit as the radio processor 104.

In various embodiments, the transceiver module 124 may comprise one or more transceivers or components arranged to support voice and/or data communications for the wireless network systems or protocols as previously described. For example, the mobile computing device 100 may comprise one or more radio frequency (RF) transceivers 124a supporting voice communication (e.g., CDMA, GSM, UMTS), WWAN data communication (e.g., EVDO, EVDV, CDMA/1xRTT, GSM/GPRS, EDGE, HSDPA), WLAN data communication (e.g., WiFi, WiMAX), and/or WPAN data communication (e.g., Infrared protocols, Bluetooth®, IR, EMI) in accordance with the described embodiments. The transceiver module 124 may further comprise a GPS transceiver 124b supporting position determination in accordance with the described embodiments.

The mobile computing device 100 may comprise an antenna system 126 coupled to the radio processor 104 through the transceiver module 124. The antenna system 126 may transmit and/or receive electrical signals and may comprise or be implemented as one or more internal antennas and/or external antennas tuned for operating at one or more frequency bands. As shown, the antenna system 126 may comprise one or more antennas 126a connected to one or more RF transceivers 124a supporting voice and/or data communications in accordance with the described embodiments. The antenna system 126 may further comprise a GPS antenna 126b connected to the GPS transceiver 124b supporting position determination in accordance with the described embodiments.

The radio processor 104 may comprise or implement a position module 152, such as a GPS engine supporting satellite based position determination capabilities, for the mobile computing device 100. In some embodiments, the position module 152 may be implemented as software operating in conjunction with the GPS transceiver 124b for allowing the mobile computing device 100 to receive and process GPS satellites signals and determine a position fix. The information generated and/or obtained by the position module 152 generally may comprise any type of information associated with the location of the mobile computing device 100 such as latitude, longitude, altitude, heading information, vector information including horizontal and vertical velocity, sector-based position location, position uncertainty, device orientation, and so forth.

The mobile computing device 100 may comprise a subscriber identity module (SIM) 128 coupled to the radio processor 104. The SIM 128 may comprise, for example, a removable or non-removable smart card arranged to encrypt voice and data transmissions and to store user-specific data for allowing a voice or data communications network to identify and authenticate the user. The SIM 128 also may store data such as personal settings specific to the user.

The mobile computing device 100 may comprise a motion sensor 146 in communication with radio processor 104 over bus 148. Motion sensor 146 may comprise, for example, one or more accelerometers, such as, but not limited to, a microelectrical mechanical systems (MEMS) based accelerometer, a two-axis accelerometer, or a three-axis accelerometer. In an embodiment, motion sensor 146 may detect motion without the use of cellular or radio signals, which may be unavailable. Motion sensor 146 may detect when the mobile computing device 100 is in motion, such as when the device operator is walking, or riding in a vehicle. Motion sensor 146 may inform radio processor 104 when it detects motion. In an embodiment, motion sensor 146 may inform host processor 102 when it detects motion, via bus 138.

As mentioned above, the host processor 102 may be arranged to provide processing or computing resources to the mobile computing device 100. For example, the host processor 102 may be responsible for executing various software programs such as system programs and application programs to provide computing and processing operations for the mobile computing device 100.

System programs (not shown) generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may use any suitable OS in accordance with the described embodiments, such as a Palm OS®, Palm OS® Cobalt, Palm® webOS™, Microsoft® Windows OS, Microsoft Windows® CE, Microsoft Pocket PC, Microsoft Mobile, Symbian OS™, Embedix OS, Linux, Binary Runtime Environment for Wireless (BREW) OS, JavaOS, a Wireless Application Protocol (WAP) OS, and so forth.

Application programs generally may allow a user to accomplish one or more specific tasks. Examples of application programs may include, without limitation, one or more messaging applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

As shown in FIG. 1, the mobile computing device 100 may comprise or implement several applications 130 arranged to provide a variety of functionality to device 100. The applications 130 may comprise, for example, a telephone application 131 such as a cellular telephone application, a Voice over Internet Protocol (VoIP) application, a Push-to-Talk (PTT) application, and so forth. The applications 130 may further comprise a calendar application 132, a map application 133, an Internet browser application 134, an instant messaging (IM) application 135, an e-mail application 136, etc.

Map application 133 may include map applications that function within Internet browser application 134, or stand-alone applications. In an embodiment, map application 133 may provide information in addition to location and direction information. Map application 133 may provide, for example, business look-up information, information about what businesses, business types, or residences are located near a specified location, etc. It is to be understood that the embodiments are not limited in this regard and that the applications 130 may include any other type of application that is consistent with the described embodiments.

Mobile computing device 100 may comprise a power management module 152 to monitor various aspects of device operation and discontinue battery-using operations in certain specified scenarios. Power management module 150 may comprise, for example, hardware and/or software such as logic (e.g., instructions, data, and/or code) to be executed by a logic device (e.g., host processor 102). The logic may be stored internally or externally to the logic device on one or more types of computer-readable storage media. Power management module 150 may access application data, such as from the device user's calendar app 132, and/or map application 133. Power management module 150 may access position data, e.g. from position module 152. Power management module 150 is discussed in further detail below.

Mobile computing device 100 may comprise a date/time module 154 that stores and updates the current calendar date and time. Date/time module 154 may supply the date and time to power management module 150, which may use the date and/or time to control battery usage by shutting down or enabling device applications.

The mobile computing device 100 may store usage pattern data 140, user preference data 142, and/or application support data 144. Power management module 150 may access usage pattern data 140, user preference data 142, and/or application support data 144 when determining whether to initiate a battery saving operation.

Usage pattern data 140 may include data regarding patterns of use of the mobile device 100. Patterns of use may include, but are not limited to, frequency of use of applications, time-of-day of use, charging habits, charging locations, usage habits, location information, calendar information, call log history, Bluetooth information, and other data that may be collected live based on user patterns etc. In an embodiment, usage pattern data 140 may include usage pattern data aggregated from other similar users.

User preference data 142 may include data about the user's preferences on when and how to save battery power. The user may indicate, for example, that he wishes to preserve battery power by turning off transceiver 124 when he is in a low-signal area, in a meeting, or in a specific location. User preference data 142 may be stored as rules that power management module 150 may apply when determining when to suspend wireless communications to conserve battery power.

Application support data 144 may include data used by applications 130. Usage pattern data 140, user preference data 142, and/or application support data 144 may be stored in the memory 110 of the mobile computing device, for example. Application support data 144 may include, for example, calendar events, signal coverage maps, call logs, call history, etc.

Figure 2:
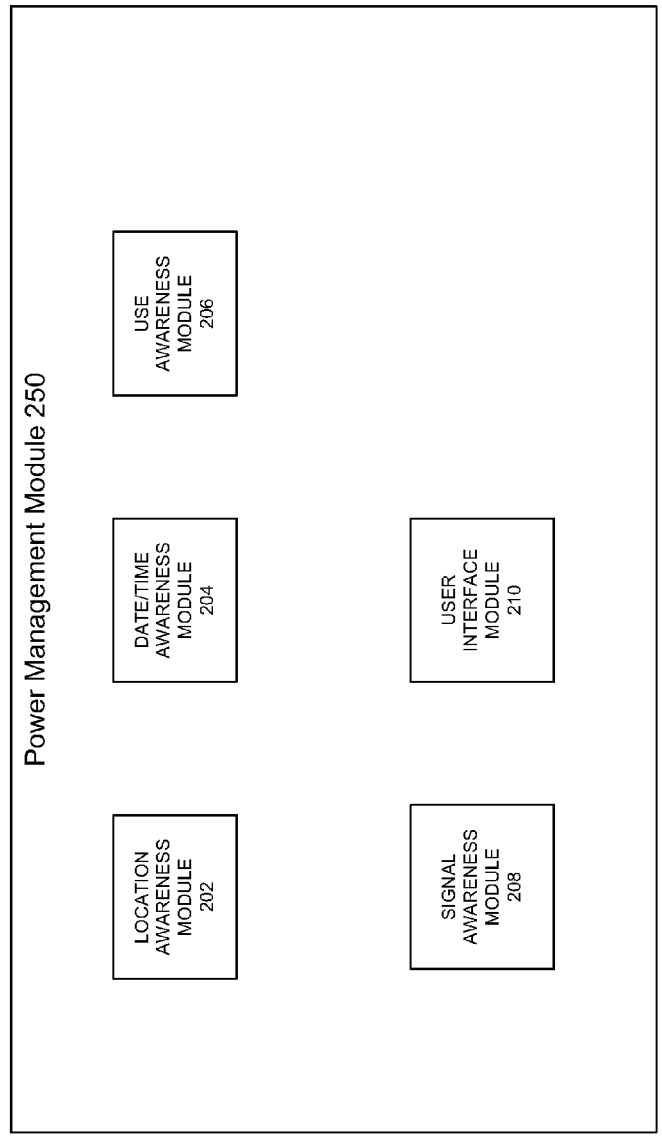
FIG. 2 illustrates a power management module in accordance with one or more embodiments.

FIG. 2 is a block diagram 200 illustrating an embodiment of a power management module 250. Power management module 250 may comprise one or more modules to monitor conditions of mobile computing device 100 and to make power management decisions. In an embodiment, power management module 250 may comprise, for example, a location awareness module 202, a date/time awareness module 204, a use awareness module 206, a signal awareness module 208, and a user interface module 210. Power management module 250 may use information from one or more modules to make power management decisions, such as whether to suspend, resume, or shut down wireless communication functions to preserve battery. The embodiments are not limited in this context.

Location awareness module 202 may monitor the location of device 100. For example, location awareness module 202 may poll or receive information from position module 152 and/or motion sensor 146 regarding geographical and/or latitudinal coordinates. In addition, location awareness module 202 may also poll or receive information from, for example, map app 133, which may indicate a type of location of device 100. A location type may include, for example: a restaurant, a theater, a doctor's office, a church, a park, etc.

Power management module 250 may use such location type information from location awareness module 202 to turn off signal searching operations in radio processor 104 when device 100 is in a location in which the user has indicated no wireless communication should occur. For example, when device 100 is in a house of worship, a theater or a doctor's office, the user may indicate that no telephone calls or text messages should be received, and location awareness module 202 may cause the radio processor 104 to stop searching for and maintaining a signal.

Power management module 250 may use location information from location awareness module 202 to enable or disable other operations. For example, while device 100 is located within a range of the user's primary computer, as determined, for example, via a Bluetooth connection, or by a GPS location, location awareness module 202 may disable the email application 136 from checking for email. This rule may apply when the user performs most email functions at the primary computer, and only uses the mobile device 100 to check for email when away from the primary computer.

Date/time awareness module 204 may monitor the date and time, for example, from date/time module 154, and enable power management decisions based either directly on date or time, or date or time information in conjunction with other information. For example, date/time awareness module 204 may compare the current date or time with events scheduled in calendar app 132. For example, if the date and time correspond to a scheduled meeting in calendar app 132, date/time awareness module 204 may cause power management module 250 to disable all wireless communication on device 100 for the duration of the meeting, or until a specified time period before or after the meeting ends. Date/time awareness module 204 may also track the time of day and/or duration of use of certain battery-consuming applications. This tracked information may be provided to use awareness module 206, as will be discussed below.

Location awareness module 202 and date/time awareness module 204 may be aware of when device 100 is in an airplane. If calendar app 132 indicates a scheduled flight, and/or location awareness module 202 notes an altitude indicating probable flight, then device 100 may be switched over to "airplane mode" or otherwise have wireless communications turned off.

Use awareness module 206 may track many aspects of how a user makes use of device 100. Example of uses tracked may include, but are not limited to: when email app 136 is used, when and/or how device 100 is charged, whether the user is using the same or equivalent application on another device, when the user uses Wi-Fi or Bluetooth, when phone calls are typically made or received, etc.

For example, if the user only checks email in the morning, or only a few times a day, power management module 250 may cause email app 136 to fetch email only near those times, or only every few hours, according to the user's email use pattern. In another example, if the user typically reads email during meetings, power management module 250 may cause device 100 to wait until a short period before the start of a meeting to check for and download email to device 100.

In another example, use awareness module 206 may track when and for how long device 100 is plugged in for battery charging. The method of charging may also be tracked, e.g. is the device plugged in via a USB cable or via an electrical outlet? If device 100 is only plugged in sporadically, or for only short periods of time, it may be advantageous to maximize the charging, for example, by turning device 100 off, or by placing it in a low-power consumption mode.

In another example, use awareness module 206 may detect when the device user is using the same or equivalent applications on device 100 and another device. For example, if the user is logged into the same account of an instant messaging application from more than one device, power management module 250 may shut down IM app 135 on device 100. Other applications may include, for example, email applications, chat room applications, social networking applications, etc.

In another example, use awareness module 206 may monitor when and where device 100 uses Wi-Fi and/or Bluetooth or other wireless communication, and may cause power management module 250 to disable the communication otherwise.

Signal awareness module 208 may monitor and track wireless signal strength and change device 100 functionality based on signal strength in order to conserve battery power. For example, in low signal areas, signal awareness module 208 may, in consideration of additional factors, cause power management module 250 to disable temporarily the wireless transceiver 124 and/or radio processor 104 until signal strength improves. The additional factors may include, for example, an absence of scheduled meetings, while the location of the mobile device is unchanged, during long known periods of inactivity (such as at night), and/or while the battery is below a certain charge threshold.

In an embodiment, signal strength awareness module 208 may use data from position module 152 and/or map app 133 to build a signal strength map for the user. Signal awareness module 208 may then be able to warn the user when device 100 is nearing a low-signal area. In an embodiment, use awareness module 206 may use such a signal strength map to educate the user as to an optimal location to leave device 100 for an extended period of time without charging, i.e. an area in a home or business where signal strength is high. In an embodiment, signal strength maps from multiple device users may be provided to the device manufacturer and/or service provider to provide an aggregated map of signal strength in a geographic area.

In an embodiment, signal strength awareness module 208 and location awareness module 202 may note locations where a short-range signal is weakening, such as when device 100 and a paired Bluetooth device are close to being out of range and turn off the Bluetooth signal. When device 100 later approaches that location, the Bluetooth signal could then be turned on again automatically.

User interface module 210 may provide an interface to communicate information to the user of device 100 about battery conservation, and to request information from the user regarding preferences for battery conservation practices. User interface module 210 may provide a learning period where the user's interactions with device 100 are monitored and analyzed. User interface module 210 may educate or suggest different practices to the user, such as using a power outlet instead of a USB cable to charge device 100. User interface module 210 may allow the user to select scenarios when battery power should be conserved.

Figure 3:
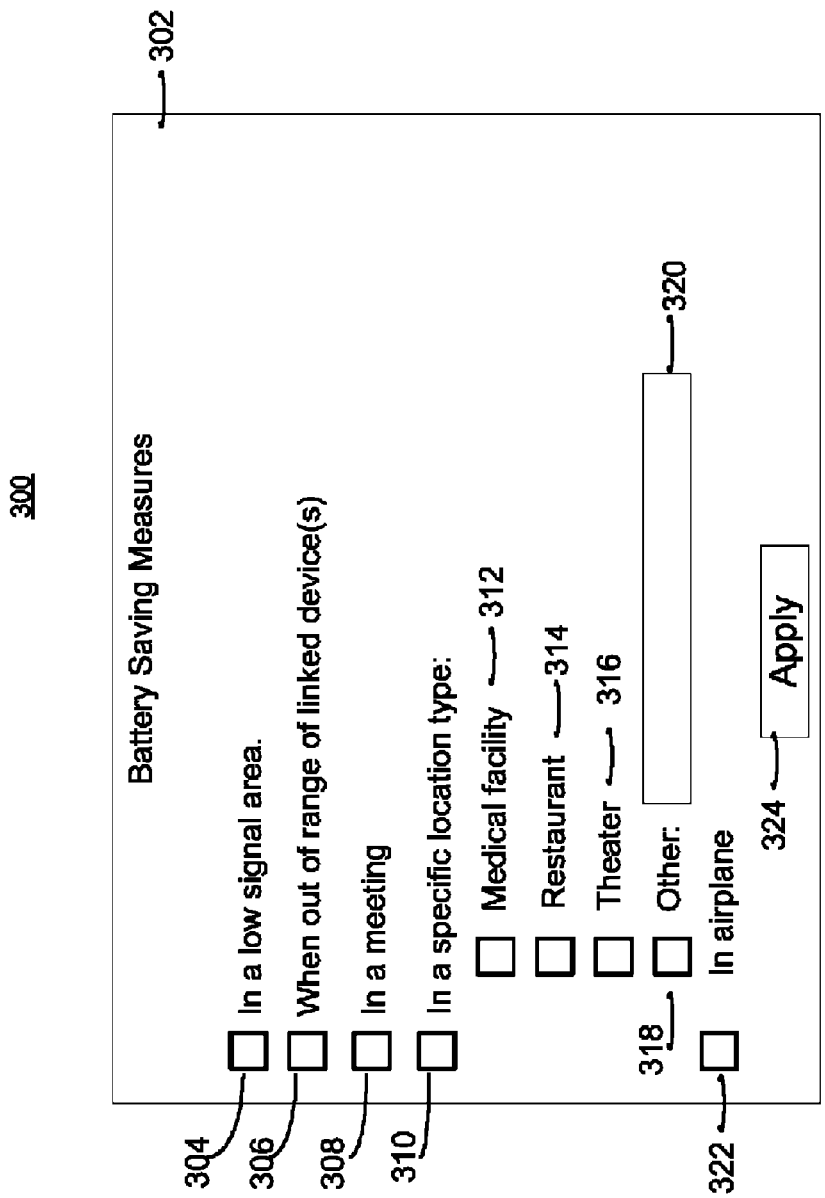
FIG. 3 illustrates a battery saving measures user interface in accordance with one or more embodiments.

FIG. 3 illustrates a user interface 300 in accordance with one or more embodiments. User interface 300 may present a menu or dialog box 302 containing a number of scenarios when the user may elect to use battery saving measures, such as those described above. In an embodiment, the selections may include an "in a low signal area" selection 304, which may turn off or suspend wireless communications in low signal strength areas. The selections may include a "when out of range of linked device(s)" selection 306, which may turn off or suspend Bluetooth or other short range radio communication when out of range of a linked device. The selections may include an "in a meeting" selection 308, which may turn off or suspend wireless communications and email checking when the date/time and calendar indicate that the user is in a meeting.

The selections may further include an "in a specific location type" selection 310, which may turn off or suspend wireless communication when the location of device 100 is a specific location type. Selection 310 may include further selections for specific location types, such as "medical facility" selection 312, "restaurant" selection 314, or "theater" selection 316. "Other" selection 318 may allow the user to add location types not already listed. In an embodiment, entry box 318 may allow the user to type in a location type. Alternatively, entry box 318 may be a drop-down menu that lists location types consistent with location types used, for example, by map app 133. The embodiments are not limited to these examples.

Once the user has selected the battery saving measures that he wishes to use, the selections may be saved by selecting the "apply" button 322. The selection may then be saved, for example, in user preference data 142.

Figure 4:
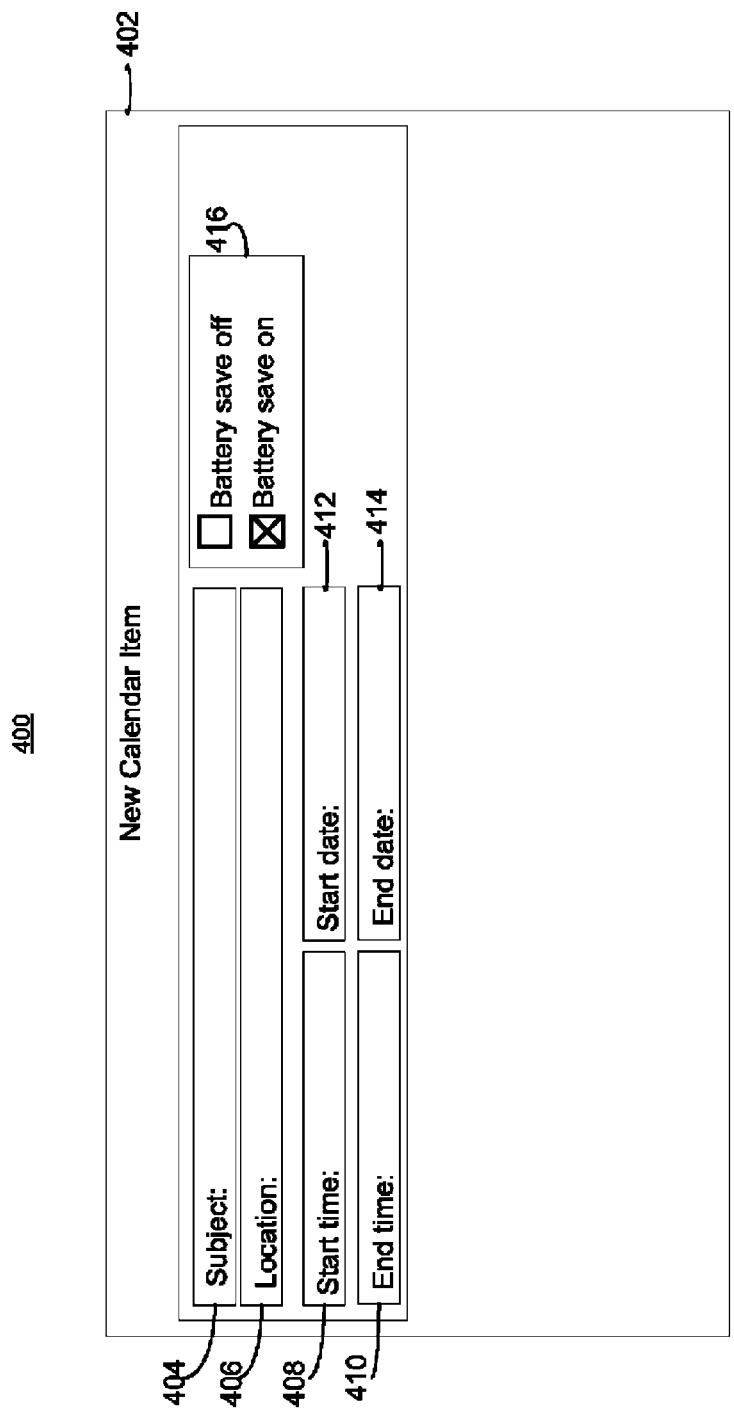
FIG. 4 illustrates a new calendar item user interface in accordance with one or more embodiments.

FIG. 4 illustrates a new calendar item UI 400 in accordance with one or more embodiments that may be displayed to a user of the mobile computing device 100 of FIG. 1. In various embodiments, the new calendar item UI 400 may be supported by an application such as calendar app 132 and user interface module 210. The embodiments, however, are not limited in this context.

In various implementations, the new calendar item UI 400 may be presented to the user when a new calendar event is created by the user, or when an event invitation is received via calendar app 132. It can be appreciated, however, that the embodiments are not limited in this context.

As shown, the new calendar item UI 400 may comprise a title bar 402 for displaying that the item is a new calendar item. In various embodiments, the messaging UI 400 may be arranged to display a subject 404 for the event, a location 406 for the event, a start time 408 and end time 410, as well as a start date 412 and an end date 414.

The new calendar item UI 400 may comprise a battery savings selection box 416, which may allow the user to choose whether to implement battery saving measures during the event. The battery saving measures may include those previously described in FIG. 3, and/or additional battery saving measures.

FIG. 5 illustrates a logic flow 500 in accordance with one or more embodiments. The logic flow 500 may be performed by various systems and/or devices and may be implemented as hardware, software, and/or any combination thereof, as desired for a given set of design parameters or performance constraints. For example, the logic flow 500 may be implemented by a logic device (e.g., processor) and/or logic (e.g., power management module) comprising instructions, data, and/or code to be executed by a logic device. For purposes of illustration, and not limitation, the logic flow 500 is described with reference to FIG. 1. The embodiments are not limited in this context.

In various embodiments, the logic flow 500 may comprise monitoring and analyzing patterns of user operation on device 100 (block 502). This may be performed, for example, by use awareness module 206. Block 502 may be performed continuously, until disabled by the user, or for a specific learning period. User operations may include, but are not limited to: a battery charging method, e.g. USB or wall outlet; a battery charging duration, e.g. less than an hour, or several hours; a frequency of use of an application operating on device 100, e.g. how many times the user checks email on device 100, or talks on the phone; a time of day of use of an application operating on device 100, e.g., when does the user check email, or use Wi-Fi; a duration of use of an application operating on device 100, e.g. for how long at a time does the user use the browser; or a location of use of an application operating on device 100, e.g., the user uses Wi-Fi only at the office and the coffee shop, or the user only checks email when not at work.

Analyzing the patterns of user operation may include any statistical operations that may generate a useable rule to be applied to future behavior. For example, the charging duration may be aggregated and averaged to determine that the user on average charges device 100 for 20 minutes at a time, twice a day. Results of the analysis may be stored as user pattern data 140.

The logic flow 500 may comprise monitoring the location of device 100 (block 504). Block 504 may be performed, for example, by location awareness module 202. Location awareness module 202 may receive position and/or movement information from, for example, position module 152 and motion sensor 146.

The logic flow 500 may comprise measuring wireless signal strength for one or more wireless signals (block 506). Block 506 may be performed by signal awareness module 208. Signal awareness module 208 may monitor any or all of the wireless signals that device 100 is capable of sending and receiving, such as, but not limited to, cellular radiotelephone signals, radio frequency signals, Wi-Fi signals, WiMAX signals, infrared signals, Bluetooth signals, etc. Block 506 may further include storing signal strength information by location, to create a signal strength map.

The logic flow 500 may comprise monitoring the date and/or time (block 508). Block 508 may be performed by date/time awareness module 204.

The logic flow 500 may suspend one or more wireless communications according to monitored or measured conditions from any of blocks 502, 504, 506 or 508 (block 510). While blocks 502, 504, 506 and 508 are shown serially in FIG. 5, in various embodiments, blocks 502, 504, 506 and 508 may be performed in parallel. Blocks 502, 504, 506 and 508 may be performed at different time intervals from each other. Information from multiple blocks may also be used together in block 510 to determine when wireless communications should be suspended.

For example, if analysis from block 502 indicates that the user is statistically unlikely to check email between 8 p.m. and 7 a.m., and block 508 indicates that the time is in that interval, then in block 510, the wireless communication involved in checking and downloading email may be suspended until shortly before 7 a.m.

In another example, if block 504 indicates that device 100 is in a location type that the user has selected for battery conservation measures, then all wireless communications may be suspended.

In another example, if block 506 measures a low or zero signal strength, then the wireless communication related to that signal may be suspended in block 510. If block 504 indicates that device 100 is moving toward a mapped low-signal strength area, then block 510 may both alert the device user and suspend signal searching until device 100 is in a better signal strength area.

In another example, if a date and time from block 508 corresponds to a calendar event from calendar app 132, then wireless communication may be suspended for the duration of the event in block 510. The embodiments are not limited to these examples.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

Any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A wireless computing apparatus to send and receive wireless communications, comprising:
   a processor;
   a battery to supply power to the processor;
   a memory coupled to the processor to store user pattern data or user preference data; and
   a power management module coupled to the processor to monitor a location of the apparatus and to suspend wireless communication according to the location and the user pattern data or user preference data to reduce battery consumption, the power management module to monitor and analyze patterns of battery charging operation, generate a rule for future behavior to store as the user pattern data based on the analyzed patterns of battery charging operation, and when the user pattern data indicates that a first battery charging operation is used that is slower than a second battery charging operation, and that a battery charging duration is shorter than is needed to completely charge the battery, the power management module to suggest the second battery charging operation or turn off the device while charging to enable faster charging.

2. The apparatus of claim 1, further comprising:
   a calendar application operative on the processor, and comprising a calendar event; and
   the power management module further to monitor a date and time of the apparatus, and to suspend wireless communication according to the date or time and a calendar event to reduce battery consumption.

3. The apparatus of claim 1, further comprising:
   a map application operative on the processor and comprising data on location types at map locations; and
   wherein monitoring a location of the apparatus comprises monitoring a location type, the power management module further to suspend wireless communication according to the location type and at least one of: the user pattern data or user preference data to reduce battery consumption.

4. The apparatus of claim 1, wherein the power management module is further to monitor a signal strength of a wireless communication, and to suspend or resume a wireless communication according to signal strength.

5. The apparatus of claim 1, wherein the power management module is further to create a signal strength map comprising wireless signal strength at locations where the apparatus has been, and to alert the user when the apparatus is approaching a known low-signal location.

6. The apparatus of claim 1, wherein the power management module is further to monitor and analyze patterns of user operation of the apparatus and to store the analysis as user pattern data.

7. The apparatus of claim 6, wherein the power management module is to monitor of at least one of: a battery charging method, or a battery charging duration; and to monitor at least one of: frequency, time of day, or duration of use of an application operating on the apparatus.

8. The apparatus of claim 6, wherein the power management module may monitor and analyze patterns of user operation during a learning period.

9. A method operating on a wireless computing device, the method comprising:
   monitoring and analyzing patterns of user operation of the device, wherein user operation includes at least battery charging operation;
   storing the analysis as user pattern data;
   generating a rule for future behavior based on the user pattern data; and
   suspending wireless communication according to the user pattern data to reduce battery consumption on the device,
   wherein, when user pattern data indicates that a first battery charging operation is used that is slower than a second battery charging operation, and that a battery charging duration is shorter than is needed to completely charge a battery on the device, the machine-readable medium further comprises instructions that when executed enable the wireless computing device to suggest the second battery charging operation or turn off the device while charging to enable faster charging.

10. The method of claim 9, wherein monitoring comprises monitoring at least one of:
    a battery charging method;
    a battery charging duration;
    a frequency of use of an application operating on the device;
    a time of day of use of an application operating on the device;
    a duration of use of an application operating on the device; or
    a location of use of an application operating on the device; and
    wherein analyzing patterns comprises identifying at least one of: a day, a time, or a location when an application is used.

11. The method of claim 10, wherein an application comprises at least one of:
a calendar application, an email application, an instant messaging application, a browser application, a telephone application, or a map application.

12. The method of claim 9, further comprising:
monitoring a location of the device;
determining a location type of the location; and
suspending wireless communication according to the location type and the user pattern data to reduce battery consumption on the device.

13. The method of claim 9, further comprising:
measuring a wireless signal strength at the device;
generating and storing a signal strength map comprising signal strength measurements at locations;
alerting a user when the device is approaching a low-signal strength area; and
suspending wireless communications while the device is in a low-signal strength area.

14. The method of claim 9, further comprising:
monitoring a short-range wireless signal connection to a second device and a location of the wireless computing device;
storing the location of the wireless computing device when the short-range wireless signal connection to the second device is lost;
disabling the short-range wireless signal; and
enabling the short-range wireless signal when the wireless computing device approaches the stored location.

15. A machine-readable storage medium comprising instructions that when executed enable a wireless computing device to:
monitor a date and time of the device,
suspend wireless communication according to the date or time to reduce battery consumption,
monitor and analyze patterns of operation of the device, the operation including battery charging operation;
store the analysis as pattern data; and
generate a rule for future behavior based on the pattern data,
wherein, when pattern data indicates that a first battery charging operation is used that is slower than a second battery charging operation, and that a battery charging duration is shorter than is needed to completely charge a battery on the device, the machine-readable medium further comprises instructions that when executed enable the wireless computing device to suggest the second battery charging operation or turn off the device while charging to enable faster charging.

16. The machine-readable medium of claim 15, further comprising instructions that when executed enable the wireless computing device to:
monitor a location of the device;
determine a location type of the location; and
suspend wireless communication according to the location type to reduce battery consumption on the device.

17. The machine-readable medium of claim 15, further comprising instructions that when executed enable the wireless computing device to:
measure a wireless signal strength at the device;
generate and store a signal strength map comprising signal strength measurements at locations;
alert a user when the device is approaching a low-signal strength area; and
suspend wireless communications while the device is in a low-signal strength area.

18. The machine-readable medium of claim 15, further comprising instructions that when executed enable the wireless computing device to:
suspend wireless communication according to the pattern data to reduce battery consumption on the device.

* * * * *